US011280985B2

(12) United States Patent
Kainz et al.

(10) Patent No.: US 11,280,985 B2
(45) Date of Patent: Mar. 22, 2022

(54) OPTICAL ARRANGEMENT FOR PRODUCING VIRTUAL REALITY STEREOSCOPIC IMAGES

(71) Applicant: GOOGLE LLC, Mountain View, CA (US)

(72) Inventors: Florian Kainz, San Rafael, CA (US); Xi Chen, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/627,985

(22) PCT Filed: Sep. 17, 2018

(86) PCT No.: PCT/US2018/051383
§ 371 (c)(1),
(2) Date: Dec. 31, 2019

(87) PCT Pub. No.: WO2020/060533
PCT Pub. Date: Mar. 26, 2020

(65) Prior Publication Data
US 2021/0294080 A1    Sep. 23, 2021

(51) Int. Cl.
H04N 5/225       (2006.01)
H04N 13/194     (2018.01)
(Continued)

(52) U.S. Cl.
CPC ............. *G02B 13/06* (2013.01); *G02B 30/34* (2020.01); *H04N 5/2254* (2013.01);
(Continued)

(58) Field of Classification Search
None
See application file for complete search history.

(56) References Cited

U.S. PATENT DOCUMENTS 5,721,585 A       2/1998  Keast et al.
2005/0088762 A1*  4/2005  Ohashi ................ G02B 13/22
                                                       359/754

(Continued)

FOREIGN PATENT DOCUMENTS

WO    2007095743 A1    8/2007

OTHER PUBLICATIONS

PCT Notification of Transmittal Of The International Search Report And The Written Opinion Of The International Searching Authority for PCT Application No. PCT/US2018/051383, dated Jun. 4, 2019, 14 pages.

(Continued)

Primary Examiner — Christopher Braniff

(57) ABSTRACT

An apparatus and method are disclosed to produce a stereoscopic image with a hemispherical field of view. In an implementation, the apparatus includes an optical arrangement to receive first light rays from a first fisheye lens and second light rays from a second fisheye lens. The first fisheye lens and the second fisheye lens are positioned adjacent to each other and an object side of each of the first and second fisheye lenses faces a first plane. The optical arrangement is to direct the first light rays and the second light rays onto an image sensor and bend optical axes of the first and second light rays such that the first light rays are projected onto the image sensor alongside the second light rays.

18 Claims, 9 Drawing Sheets

(51) Int. Cl.
*H04N 13/207* (2018.01)
*H04N 13/344* (2018.01)
*G02B 13/06* (2006.01)
*G02B 30/34* (2020.01)

(52) U.S. Cl.
CPC ......... *H04N 13/194* (2018.05); *H04N 13/207* (2018.05); *H04N 13/344* (2018.05)

(56) References Cited

U.S. PATENT DOCUMENTS

2010/0014174 A1    1/2010  Togino
2015/0358539 A1*  12/2015  Catt ................... H04N 5/23238
                                                    348/38
2015/0370150 A1*  12/2015  O'Neill ................ G03B 17/566
                                                    348/360

OTHER PUBLICATIONS

Indian Office Action dated Jul. 13, 2021 for IN Application No. 202047056331, 4 pages.

* cited by examiner

OPTICAL ARRANGEMENT FOR PRODUCING VIRTUAL REALITY STEREOSCOPIC IMAGES

TECHNICAL FIELD

Aspects and implementations of the disclosure relate to optical arrangements, and more specifically, to an optical arrangement for producing virtual reality stereoscopic images.

BACKGROUND

A virtual reality (VR) environment is generally described as a three-dimensional environment that can be explored by a viewer and is designed to provide simulation of an environment with a near reality experience. A virtual reality display device allows a viewer to interact with the virtual reality environment. For example, a head mounted display (HMD) can be used to view moving or still images in a VR environment. A field of view (FOV) of the VR display device is the extent of an observable area seen through the display device by the viewer at any given moment. A stereoscopic image provided within a VR display device gives depth perception to the viewer. In order to create a stereoscopic image, each eye of the viewer is provided with an image of the same object from a slightly different angle or perspective. An apparatus or a system may be used to record a scene for viewing using a VR display device.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In one implementation, an optical arrangement to produce a stereoscopic image with a hemispherical field of view is disclosed. The optical arrangement may receive first light rays from a first fisheye lens and a second light rays from a second fisheye lens. The first and second light rays may enter the first and second fisheye lenses through an object side of each of the first and second fisheye lenses. The first fisheye lens and the second fisheye lens may be positioned adjacent to each other and the object side of each of the first and second fisheye lenses may face a first plane. The optical arrangement may direct the first light rays and the second light rays onto an image sensor, and bend optical axes of the first and second light rays such that the first light rays are projected onto the image sensor alongside the second light rays.

In some implementations, the optical arrangement may modify a flange focal distance between each of the first and second fisheye lenses to the image sensor such that a modified value of the flange focal distance is greater than an initial value of the flange focal distance. The first and second light rays from the first and second fisheye lenses, respectively, may form initial images at a second plane substantially parallel to the first plane, the second plane corresponding to the initial value of the flange focal distance from the first and second fisheye lenses. The dimensions of the image sensor may be smaller than combined dimensions of the initial images formed by the first and second light rays at the second plane. The optical arrangement may be configured to generate copies of the initial images at a third plane substantially parallel to the first plane, the third plane corresponding to the modified value of the flange focal distance from the first and second fisheye lenses. The optical arrangement may be configured to produce the copies of the initial images at the third plane that are smaller than the initial images at the second plane, such that the copies of the initial images at the third plane fit alongside one another within the image sensor.

In some implementations, a first distance between respective centers of the first and second fisheye lenses may be approximately 65 millimeters. A first diameter of the first or the second fisheye lenses may be less than 65 millimeters. A second diameter of each of the initial images at the second plane may be substantially equal to a height of the image sensor. A third diameter of each of the copies of the initial images at the third plane may be substantially equal to half of a width of the image sensor.

In some implementations, respective centers of the first fisheye lens and the second fisheye lens may be positioned on a fourth plane substantially perpendicular to the first plane, a center of the image sensor may be positioned on a fifth plane substantially perpendicular to the first plane, and the fourth and the fifth planes may be separated by an offset. In some implementations, the apparatus may further comprise a set of convex lenses positioned at the second plane, the set of convex lenses configured to bend the light rays such that the light rays are directed through the optical arrangement.

The apparatus, as discussed above, may be provided independently of e.g. supplied without) an image sensor and/or fisheye lenses. Alternatively, the apparatus may further comprise a camera comprising the image sensor. The camera may comprise the optical arrangement. Either, or both, of the fisheye lenses may be removably coupled to the camera.

In various implementations, a first of the copies of the initial image may be provided to a first eye piece of a virtual reality head mounted display (HMD) and a second of the copies of the initial image may be provided to a second eye piece of the virtual reality HMD. The first of the copies of the initial image may be digitally recorded and electronically transmitted to the first eye piece of the virtual reality HMD and the second of the copies of the initial image may be digitally recorded and electronically transmitted to the second eye piece of the virtual reality HMD.

Also disclosed herein is a system comprising: a first fisheye lens and a second fisheye lens to capture first light rays and second light rays entering the first and second fisheye lenses, respectively, through an object side of each of the first and second fisheye lenses to produce a stereoscopic image with a hemispherical field of view, the first and the second fisheye lenses positioned adjacent to each other wherein the object side of each of the fisheye lenses faces a first plane; an image sensor to receive the first and second light rays captured by the first and second fisheye lenses, respectively; and an optical arrangement positioned between the first and the second fisheye lenses and the image sensor, the optical arrangement to bend optical axes of the first and the second light rays such that the first light rays are projected onto the image sensor alongside the second light rays.

In one implementation, a method for producing a stereoscopic image with a hemispherical field of view is disclosed. The method may include receiving first light rays from a first fisheye lens and second light rays from a second fisheye lens to produce the stereoscopic image with the hemispherical field of view, the first and second light rays entering the first and second fisheye lenses through an object side of each of the first and second fisheye lenses and the first and the second fisheye lenses positioned adjacent to each other, wherein the object side of each of the fisheye lenses faces a first plane; causing the first and second light rays to be directed onto an image sensor; and causing optical axes of the first and second light rays to be bent such that the first light rays are projected onto the image sensor alongside the second light rays.

In one or more of the disclosed implementations, computing devices for performing the operations of the above described implementations are also disclosed. Additionally, in implementations of the disclosure, a non-transitory machine-readable storage medium stores instructions for performing the operations of the above disclosed implementations.

BRIEF DESCRIPTION OF THE DRAWINGS

Aspects and implementations of the disclosure will be understood more fully from the detailed description given below and from the accompanying drawings of various aspects and implementations of the disclosure, which, however, should not be taken to limit the disclosure to the specific aspects or implementations, but are for explanation and understanding.

DETAILED DESCRIPTION

Figure 1:
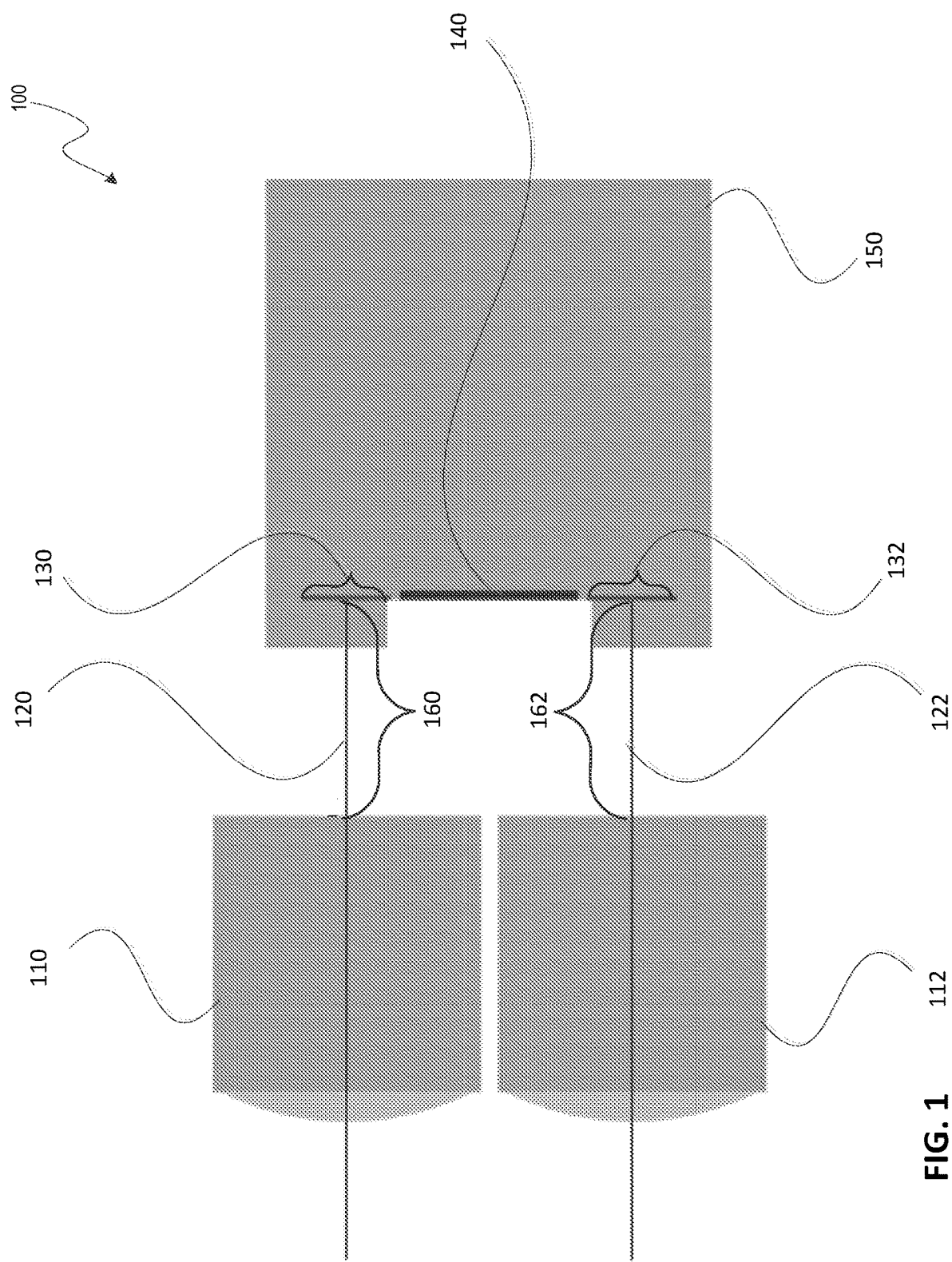
FIG. 1 illustrates an example apparatus using two fisheye lenses and an image sensor.

In order to provide a natural perception within a VR environment that is similar to that which human beings experience in real life, the images within the environment may cover a field of view (FOV) of approximately 180 degrees, or a nearly hemispherical FOV. When the viewer of the head mounted display (HMD) turns around, the viewer can keep experiencing a natural perception with a hemispherical FOV. In addition, the images may be stereoscopic images for providing depth perception.

A camera with a fisheye lens can capture a circular image with an approximately 180 degree FOV. A fisheye lens is an ultra-wide angle lens that produces a wide panoramic or hemispherical image with distorted, convex non-rectilinear (e.g., not straight lines of perspective) appearance. A fisheye lens may include an object side. In order to provide stereoscopic images, a pair of images showing a scene from slightly different points of view can be recorded using two fisheye lenses. In the VR display device, one of the fisheye images is shown to the viewer's left eye, and the other fisheye image is shown to the viewer's right eye. When these images are viewed together on the HMD, the subtle differences between the two images cause the user to perceive a three dimensional (3D) image with depth.

Additionally, natural depth perception is achieved when the fisheye lenses to capture the fisheye images are positioned in a way that is similar to human eye positioning. Human eyes are forward facing with a particular range of spacing in between the two eyes. Both eyes face the same scene and thus view substantially the same portions of the scene. Generally, the distance between the pupils of an average, adult human's eyes, which is also called inter pupillary distance (IPD), is usually within a range of 55 to 75 mm, with a mean IPD being approximately 65 mm. Thus, the two fisheye lenses can provide natural depth perception if the fisheye images can be taken from two points of view that are spaced apart between 60 to 70 mm, and preferably 65 mm. For example, the two fisheye lenses can be placed 65 mm apart horizontally and at the same height above the ground. If the scene changes or includes motion, then both of the images need to be taken at the same time.

Given the above criteria, natural perception can be achieved by using two cameras or one camera with two lenses to capture the two fisheye images. Using two cameras to capture the two images have several disadvantages. Operating two cameras is not user friendly. There needs to be exact synchronization of operation between the cameras. The generally large size of the camera bodies create constraints on the distance between the cameras and how close the fisheye lenses of the cameras can be placed to each other. Because of the bulky size of the camera bodies, it is not possible to match the distance between the two camera lenses to the distance between a person's eyes. If two cameras are used to record the images where the lenses in each camera are placed at significantly greater than the average IPD of the human eyes, then the resulting images have an exaggerated 3D effect where the objects in the scene look unnaturally small. This is even more acute for objects closer to the camera. For example, if the lenses are placed 13 centimeters apart (twice the average human IPD), then a person in the image may appear half of their actual size and the VR environment may not appear natural.

Some consumer grade cameras exist for capturing 180 degree FOV with stereoscopic images. These consumer grade cameras use small fisheye lenses to accommodate two lenses side by side within one camera with two small image sensors. These lenses and sensors may be smaller in size than professional grade camera lenses and sensors. However, because of the sensor size limitation of these consumer grade cameras, the quality of images produced by these cameras is low. Smaller lenses are physically limited in terms of producing higher quality images. The images may not be sharp due to a lower quality of the lenses. The small sensors also have high dynamic range issues. Dynamic range of an image sensor is a measure of the maximum contrast (ratio of maximum and minimum brightness) that the sensor can capture faithfully. Dynamic range issues may arise with images that have high contrast between the pixels. For example, in a scene from an indoor point of view looking outdoors, the indoor portions may appear completely dark while the outdoors portions may appear overexposed and featureless white. Particularly, in a 180 degree FOV scene, there is generally a combination of very dark portions and very bright portions because of the wide area captured. Additionally, a small lens also has limited resolution. An image with a large FOV needs to have high resolution (e.g., more pixels per eye) because of the large area captured. Thus, smaller lenses with low resolution do not produce high quality, sharp images.

Aspects of the present disclosure address the above-mentioned and other challenges by using two high quality fisheye lenses with one camera where the respective centers of the two fisheye lenses are spaced apart approximately the same distance as the average human eye IPD. Using two lenses with one camera avoids having two bulky camera bodies that prevents the lenses being placed at the same distance as human eye IPD. When the respective centers of the two fisheye lenses are spaced apart at the same distance as human eye IPD (e.g., 65 mm), the image circles produced by the fisheye lenses may also be spaced apart at the same distance (e.g., 65 mm). However, conventionally, one camera is limited to one image sensor that receives the light rays from one fisheye lens that form the images. Conventionally, an image sensor has a dimension that may not be able to accommodate image circles that are spaced apart like the average human eye IPD. That is, for example, the width of the image sensor may be smaller than the average human eye IPD, in which case the image circles may not fit within the image sensor. In order to fit the image circles produced by the fisheye lenses onto the image sensor, the present disclosure allows the image circles to be displaced from the location where the image circles initially form.

Aspects of the present disclosure provide for an optical arrangement between two high quality fisheye lenses and an image sensor of one camera to accommodate spacing apart the centers of the two fisheye lenses at a distance approximately same as the average human eye IPD while displacing the fisheye images from the fisheye lenses so that the fisheye images fit alongside each other on the image sensor. As used in the disclosure, the term "alongside" may be defined as spaced apart, and/or abutting. In an example, aspects of the disclosure provide for an optical arrangement to produce a stereoscopic image with a hemispherical field of view where the optical arrangement is to receive first light rays from a first fisheye lens and second light rays from a second fisheye lens. The first fisheye lens and the second fisheye lens may be positioned adjacent to each other. For example, the first fisheye lens and the second fisheye lens may be positioned horizontally adjacent to each other such that the distance between the centers of the fisheye lenses is approximately 65 millimeters. An object side of each of the fisheye lenses may face a first plane. For example, the fisheye lenses may be positioned similar to forward facing human eyes so that both of the fisheye lenses capture the same scene. This configuration of lenses allows stereoscopic "VR180" video or still images to be captured, in which the stereoscopic video or still images include two monoscopic video or still images, each of which has an approximately hemispherical (or 180-degree) field of view. The optical arrangement may direct the first light rays and the second light rays onto an image sensor (in other words, the first light rays and second light rays may both be directed onto different regions of the same image sensor). For example, the image sensor may be part of a camera. The optical arrangement may bend optical axes of the first and second light rays such that the first light rays are projected onto the image sensor alongside the second light rays. Bending the optical axes may bring the image circles produced by the light rays closer together to be able to fit within the image sensor.

The following description and drawings referenced herein illustrate implementations of this application's subject matter, and are not intended to limit the scope. Those of ordinary skill in the art will recognize that other implementations of the disclosed systems, devices, and methods are possible. All such implementations should be considered within the scope of the claims. Reference numbers are not necessarily discussed in the order of their appearances in the drawings. Depictions of various components within the drawings, such as optical components, are illustrative and not necessarily drawn to scale.

FIG. 1 illustrates top view of an example apparatus 100 using two fisheye lenses 110 and 112, and an image sensor 140. The image sensor 140 may be included within a camera body 150. Optical axes 120 and 122 correspond to fisheye lenses 110 and 112, respectively. In some examples, an optical axis, such as axis 120 or 122, may be an imaginary line down the center of a fisheye lens that defines the path along which central light rays propagate through the fisheye lenses. In an example, the centers of the fisheye lenses may be spaced apart approximately the same distance as the average human eye IPD. On the other hand, the dimension of the image sensor 140 may be smaller than the distance equal to the IPD. For a given type of lenses, light rays from the fisheye lens may form a fisheye image at a fixed distance from the rear of the fisheye lens. A flange focal distance 160 may be defined as the distance from the mounting flange at the rear of the fisheye lens 110 (e.g., flange plane) to the plane (e.g., focal plane) on which image sensor 140 lies. A fisheye image circle 130 may initially form at a distance equal to the flange focal distance 160 from the fisheye lens 110. Thus, the image circle 130 may appear on the same plane as the plane of the image sensor 140, however, due to the fact that the lenses are spaced apart at a distance that is greater than the image sensor's dimensions, the fisheye image circle 130 may appear outside of the image sensor 140. For example, in a given scenario, the image sensor 140 may have a dimension of 41 mm (width) by 22 mm (height). The diameter of the image circles 130 and 132 formed by the light rays from lenses 110 and 112, respectively, may be 20 mm each. The distance between the centers of the fisheye lenses 110 and 112 may be 65 mm, and thus the distance between image circles 130 and 132 may also be 65 mm. Thus, the image sensor being 41 mm in width, the image circles 130 and 132 may fall entirely outside of the image sensor 140, as depicted in FIG. 1. In such a situation, the camera is not able to record the images since they fall outside of the sensors. An optical arrangement may be utilized to displace the image circles such that the image circles end up being projected on the image sensors and fit alongside each other on the image sensor.

Figure 2:
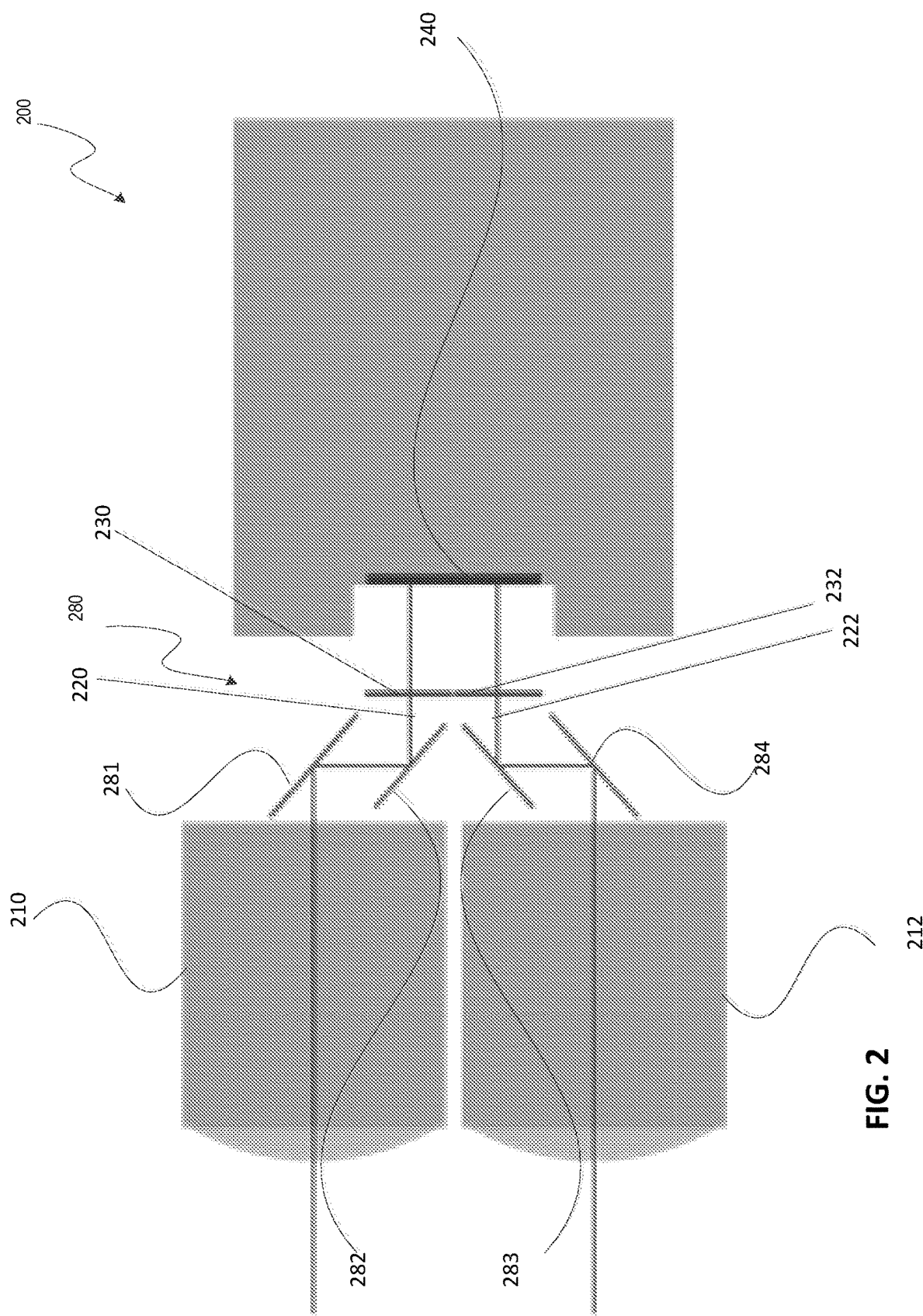
FIG. 2 illustrates an example apparatus using two fisheye lenses, an image sensor and an optical arrangement to bend light rays from the fisheye lenses.

FIG. 2 illustrates an example apparatus 200 using two fisheye lenses, an image sensor and an optical arrangement 280 to bend light rays from the fisheye lenses. Optical arrangement 280 may include a set of mirrors 281, 282, 283, and 284. The mirrors may be placed such that the mirrors bend optical axes 220 and 222 of the light rays from the fisheye lenses 210 and 212, respectively, such that the light rays from fisheye lens 210 are projected onto the image sensor 240 alongside the light rays from fisheye lens 212. In the example shown in FIG. 2, a pair of mirrors 281 and 282 are placed between fisheye lenses 210 and 212 and the plane of the image sensor 240. The optical axis 220 is bent through mirror 281 and directed to mirror 282, which bends the optical axis 220 further to direct the optical axis 220 to intersect the image sensor 240. Light rays from the fisheye lens 210 following the optical axis 220 may be projected onto image sensor 240 where the image circles created by the fisheye lens may be recorded by the image sensor 240. The optical arrangement 280 causes the distance of the light rays traveled between the rear of the fisheye lenses and the image sensor to be modified from the initial value of the flange focal distance to a modified value. The modified value may be greater than the initial value of the flange focal distance before the lights rays are bent. That is, the part of the optical axis 220 between the rear end of the fisheye lens 210 and the image sensor 240 may be longer after the mirrors bend the optical axis 220, compared to prior to the mirrors being placed between the lenses and the image sensor. As a result, the image circles 230 and 232 produced by the lenses appear in mid-air, or corresponding to the initial value of the flange focal distance from the fisheye lenses. This image sensor 240 may receive light rays that generate a blurry version of the image circles 230 and 232 at the image sensor 240.

Figure 3:
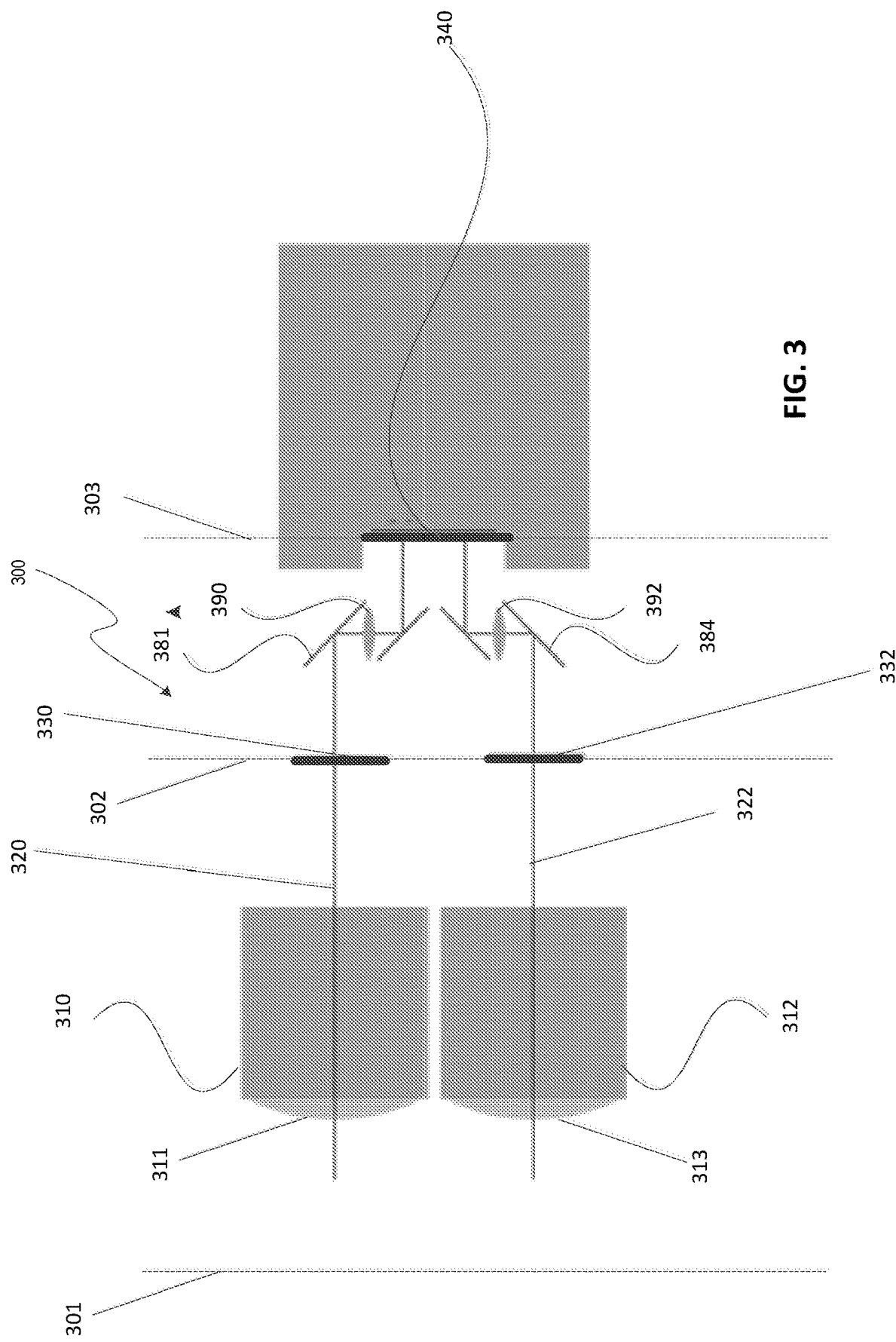
FIG. 3 illustrates an example an optical arrangement with a set of relay lenses, in accordance with implementations of the disclosure.

FIG. 3 illustrates an example an optical arrangement 300 in accordance with implementations of the disclosure. The optical arrangement 300 may produce a stereoscopic image with a hemispherical field of view. The optical arrangement 300 may receive first light rays from a first fisheye lens 310 and second light rays from a second fisheye lens 312. The first fisheye lens 310 and the second fisheye lens 312 may be positioned adjacent to each other. In an example, the distance between respective centers of the two fisheye lenses may be approximately 65 millimeters. In an example, the diameter of the first or the second fisheye lenses may be smaller than the distance between the centers of the fisheye lens, for example, less than 65 mm. The first light rays and the second light rays may enter the first fisheye lens 310 and second fisheye lens 312 through an object side 311 and 313, respectively. Object side 311 and 313 may point to the object, scene, or view being photographed. The object sides 311 and 313 of each of the first and second fisheye lenses 310 and 312, respectively, may face a first plane 301. In an example, the first plane 301 may correspond to the scene to be captured to produce the stereoscopic image. The optical arrangement 300 may be configured to direct the first light rays from fisheye lens 310 and the second light rays from fisheye lens 312 onto an image sensor 340. In an example, the width of the image sensor may be at least twice the size of the diameter of the image circles produced by the fisheye lenses and the height of the image sensor may be at least the size of the diameter of the image circles produced by the fisheye lenses. In an example, an image sensor with a high resolution can capture more detailed images. An example image sensor may have a resolution of 8000 by 4000 pixels. Optical axis 320 and 322 may be denoted as optical axes corresponding to light rays from fisheye lenses 310 and 312, respectively. The optical arrangement 300 may be configured to bend optical axes 320 and 322 of the first and second light rays such that the first light rays from fisheye lens 310 are projected onto the image sensor 340 alongside the second light rays from fisheye lens 312.

As compared to the optical arrangement of FIG. 2, the fisheye lenses 310 and 312 may be moved further away from the image sensor 340. With this configuration, the image circles 330 and 332 may form in mid-air prior to the first mirror 381 and 384 corresponding to each fisheye lens 310 and 312, respectively. The first and second light rays from the first and second fisheye lenses 310 and 312, respectively, may form initial images (e.g., image circles 330 and 332) at a second plane 302 that may be substantially parallel to the first plane 301. In an example, the diameter of each of the initial images at the second plane may not exceed the height of the image sensor or half the width of the image sensor. In an example, the diameters of the initial images may also not be substantially less than the height of the image sensor or half the width of the image sensor. The second plane 302 may correspond to an initial value of the flange focal distance between the rear of the fisheye lenses 310 and 312 to the image sensor 340 without the presence of the optical arrangement. The presence of the optical arrangement 300 may modify the flange focal distance such that the modified value of the flange focal distance is greater than the initial value.

The optical arrangement 300 may include a set of relay lenses 390 and 392. The relay lenses may be positioned in between the second plane 302 where the initial images form and the image sensor 340. The relay lenses of the optical arrangement 300 may be configured to generate copies of the initial image circles 330 and 332 at a third plane 303 substantially parallel to the first plane 301. The third plane 303 may correspond to the modified value of the flange focal distance from the rear of the first and second fisheye lenses 310 and 312. That is, the third plane corresponds to the plane where the image sensor 340 is positioned. The image sensor 340 is able to record the copies of the initial images as the copies are projected onto the image sensor 340 alongside each other, fitting within the image sensor. The copies of the initial images may then be used to produce the stereoscopic image with a hemispherical field of view.

The relay lens may include a single or multiple elements. For example, one may use a combination of six elements in a double-Gauss configuration. The details of the relay lens design, the sizes and placement of the mirrors relative to the relay lenses may depend on the optical properties of the fisheye lenses and the size of the image sensor.

Figure 4:
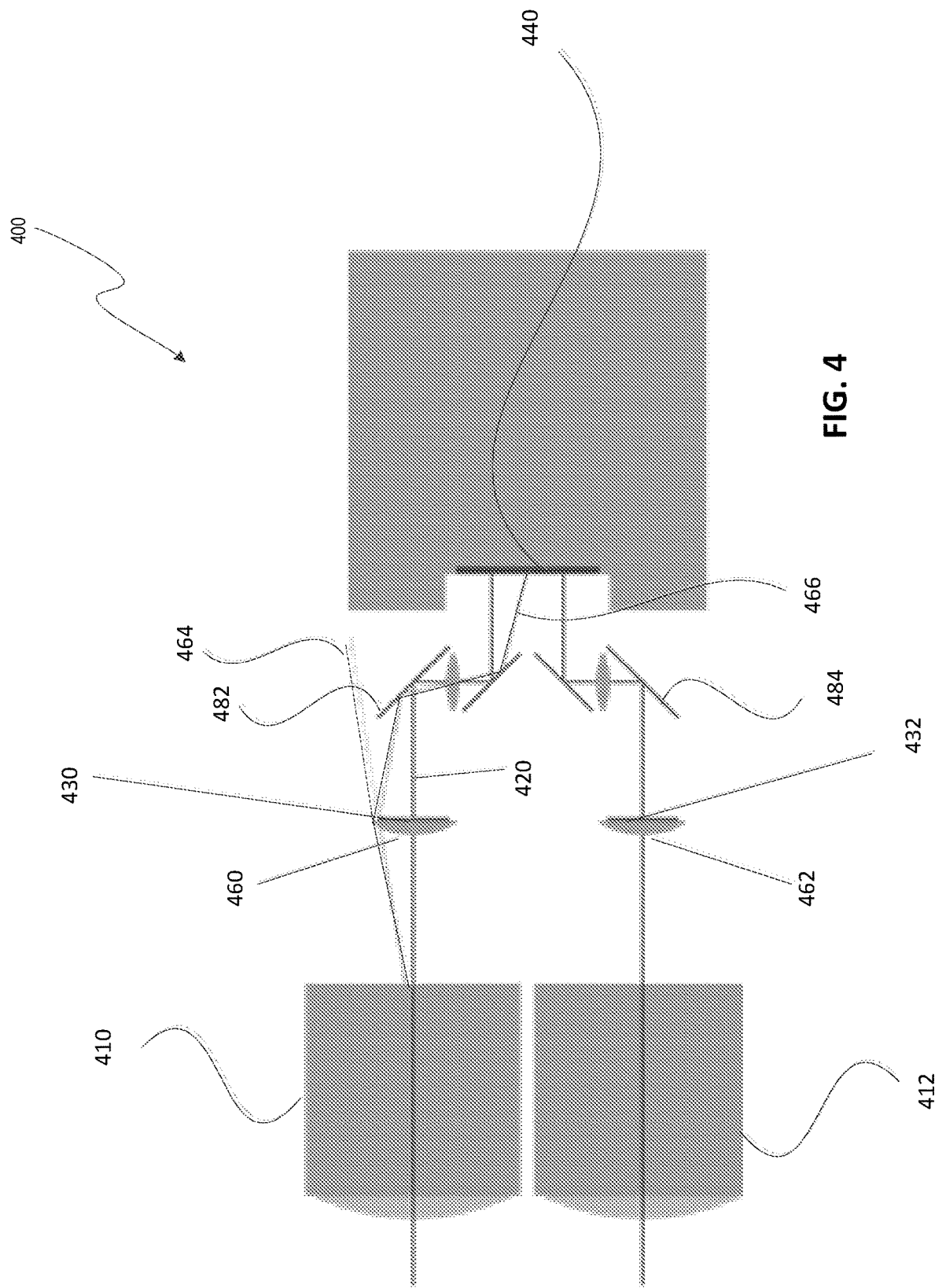
FIG. 4 illustrates an example an apparatus with a set of field lenses, in accordance with implementations of the disclosure.

FIG. 4 illustrates an example an apparatus 400 in accordance with implementations of the disclosure. The apparatus 400 may include a set of field lenses 460 and 462. In an implementation, the fisheye lenses 410 and 412 may be spaced apart from the image sensor 440 at a distance that some of the light rays that form an initial image 430 and 432 travel past the mirrors 482 and 484, respectively. An example of such a light ray 464 is shown with dotted lines. The light ray 464 may project out of the fisheye lens 410 at an angle such that it may miss intersecting with the mirror 482. As a result, these light rays may not reach the image sensor 440. Light rays missing the image sensor may cause severe vignetting (e.g, fading into the background without a definite border). In these scenarios, the outer parts of the circular image from the fisheye lenses on the image sensor may appear very dark or entirely black. The FOV of the fisheye lenses may be effectively reduced to significantly less than 180 degrees. Field lenses 460 and 462 may be placed on or near the plane where the initial images are formed (e.g., plane 302 shown in FIG. 3) to account for missing rays. Field lenses 460 and 462 may be convex lenses. Due to its convex shape, a field lens can bend the light ray, which would have otherwise escaped, back towards the optical axis (e.g., optical axis 420). This can enable the light ray to be directed through the mirrors and relay lenses of the optical arrangement such that the light ray is projected on the image sensor 440. An example of such a redirected light ray is shown as light ray 466. The field lenses can ensure that the image sensor covers the full field of view of the fisheye lenses without vignetting.

Figure 5:
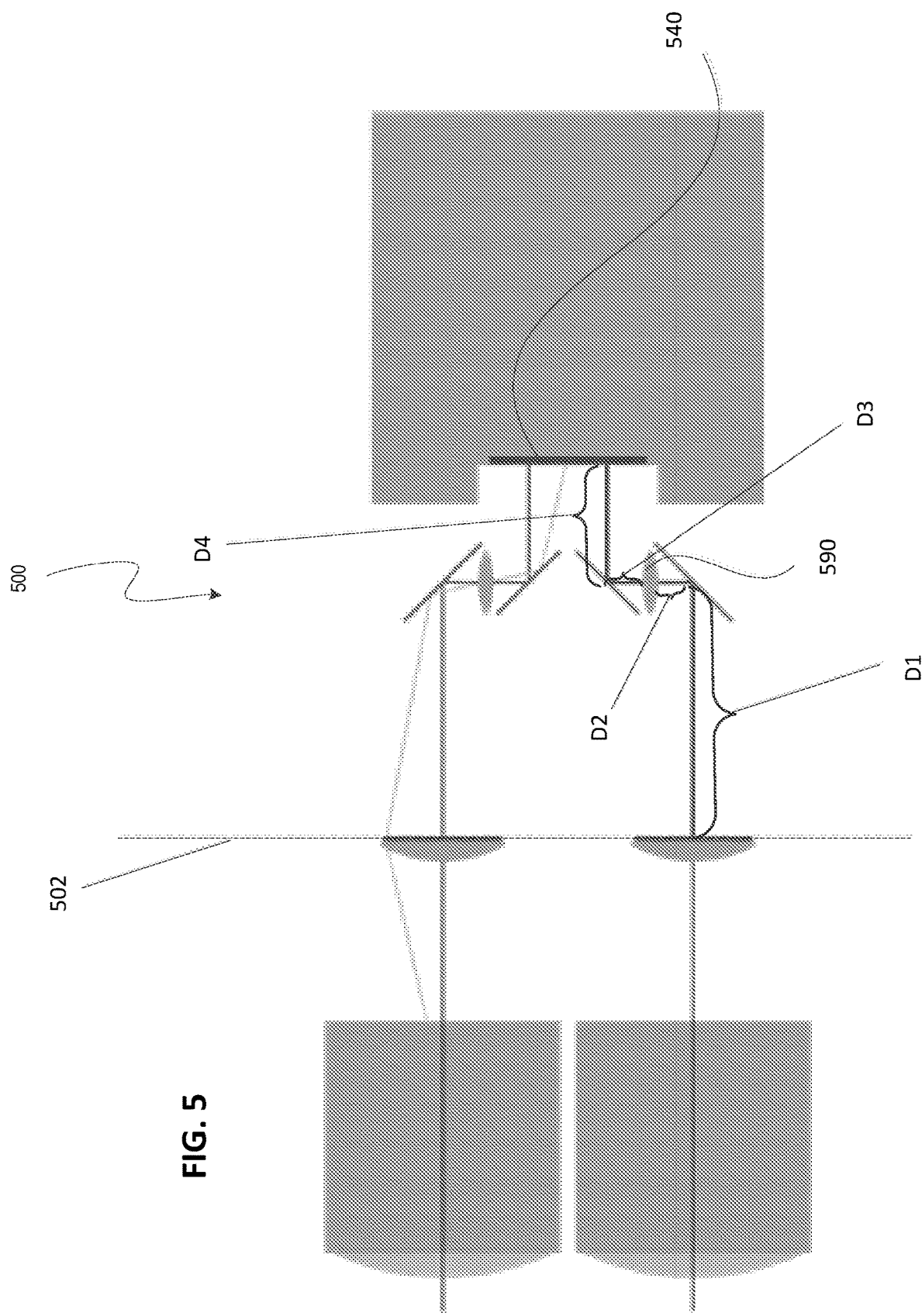
FIG. 5 illustrates an example an optical arrangement to reduce the size of fisheye images, in accordance with implementations of the disclosure.

FIG. 5 illustrates an example an optical arrangement 500 in accordance with implementations of the disclosure. The optical arrangement 500 may manipulate distance between the initial image and the relay lenses to modify the size of the images that the image sensor receives. In some implementations, the circular images produced by the fisheye lenses may be too large to fit onto the image sensor. For example, dimensions of the image sensor may be smaller than combined dimensions of the initial images formed by the first and second light rays at the second plane. For example, the image width of the image sensor may be 40 millimeters and the height of the image sensor may be 20 millimeters. The diameter of each of the initial images on a second plane where the initial images form may be 30 millimeters, making the combined dimensions of the initial images 60 millimeters, which is larger than the image sensor dimensions above. The combined dimension is too large to fit onto the image sensor for recording the copies of the initial images. To address this issue, the optical arrangement may be configured to produce the copies of the initial images at the third plane that are smaller than the initial images at the second plane, such that the copies of the initial images at the third plane fit alongside one another within the image sensor. In an example, as a result of the reduction of the size, diameter of each of the copies of the initial images at the third plane may be 20 millimeters, and the combined dimension of the copies of the initial images may be 40 millimeters, fitting within the image sensor of the example above.

In order to reduce the size of the images, the distance between the initial image and the relay lens may be increased without changing the distance between the relay lens and the image sensor. As shown in FIG. 5, distance between the second plane 502 where the initial image forms, and the relay lens 590 is denoted by D1 and D2. The distance between the relay lens 590 and the image sensor 540 is denoted by D3 and D4. The size of the fisheye image at the image sensor 540 can be reduced by a factor of (D1+D2)/(D3+D4) from the initial image formed at plane 502. For example, if each of the initial image diameters is 30 mm, then the combined diameter at the image sensor of the two images would be 60 mm. If the image sensor is 40 mm by 20 mm, then the combined diameter needs to be reduced by factor of 1.5, or to 40 mm. Thus, the distance D1+D2 is to be increased 1.5 times larger than the distance D3+D4 such that the image size is reduced down by a factor of 1.5.

Figure 6A:
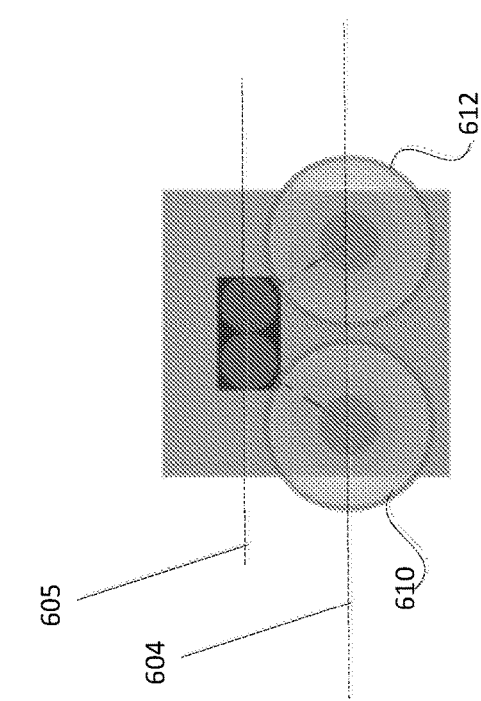
FIG. 6A-6D illustrate an example an optical arrangement with an offset between the planes of the fisheye lenses and image sensor, in accordance with implementations of the disclosure.
Figure 6B:
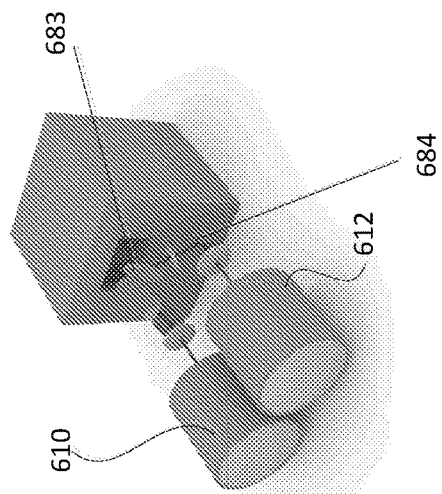
Figure 6C:
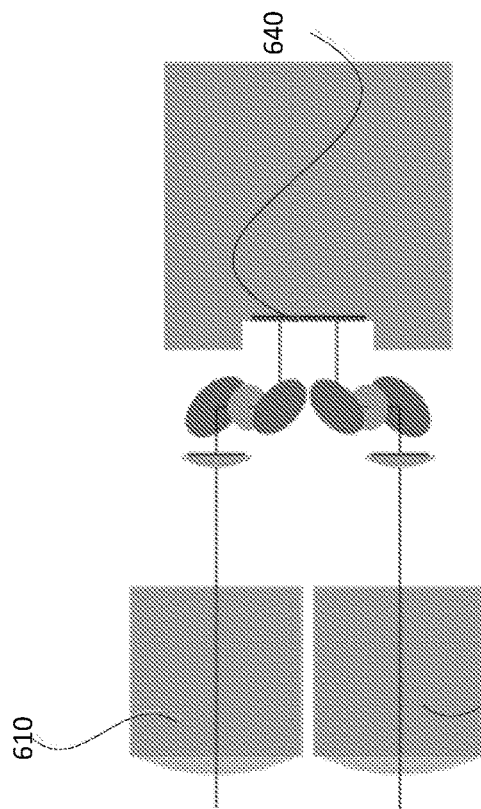
Figure 6D:
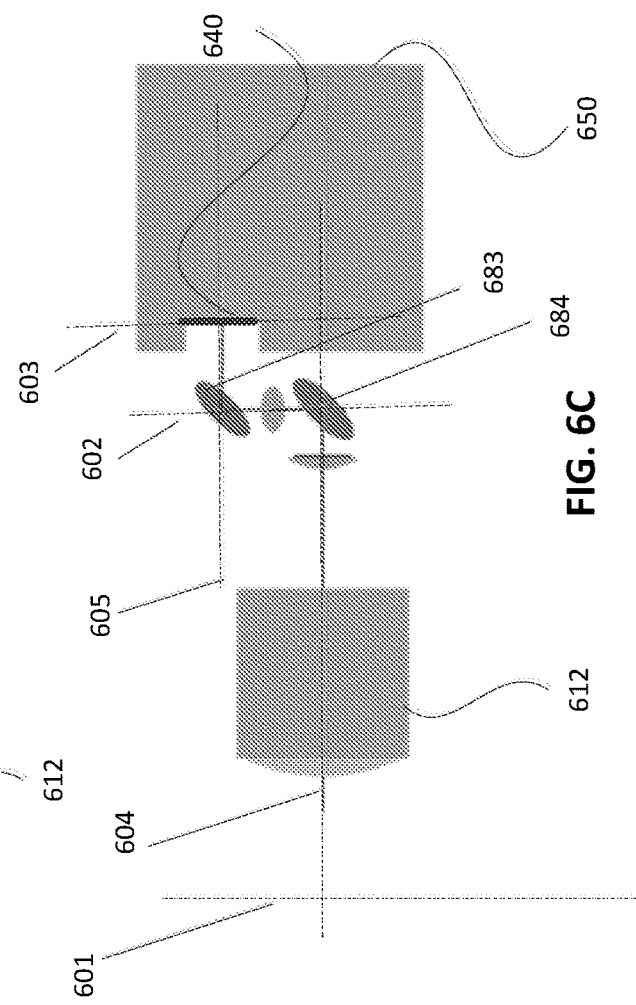

FIGS. 6A-6D illustrate an example of an optical arrangement 600 with an offset between the planes of the fisheye lenses and image sensor, in accordance with implementations of the disclosure. FIG. 6A shows a top view of the optical arrangement 600, FIG. 6B shows a front view of the optical arrangement 600, FIG. 6C shows a side view of the optical arrangement 600, and FIG. 6D shows a perspective view of the optical arrangement 600. In an implementation, respective centers of a first fisheye lens and a second fisheye lens may be positioned on a fourth plane substantially perpendicular to a first plane and a center of the image sensor may be positioned on a fifth plane substantially perpendicular to the first plane, where the fourth and the fifth planes may be separated by an offset. As shown in FIGS. 6A-6D, there are five planes 601-605. The object side of each of the fisheye lenses 610 and 612 faces the first plane 601. Centers of fisheye lenses 610 and 612 are positioned on a fourth plane 604 that is substantially perpendicular to the first plane 601 and a center of the image sensor is be positioned on a fifth plane 605 that is substantially perpendicular to the first plane 601. In other words, the fourth and fifth planes 604 and 605 are substantially parallel to each other, and substantially perpendicular to the first to third planes 601-603 (which are substantially parallel to each other), and the axes of the fisheye lenses 610 and 612 are on the fourth plane 604 and the axis of the image sensor 640 is on the fifth plane 605. The fourth plane 604 and the fifth plane 605 are separated by an offset. The offset may increase the distance between mirrors 683 and 684, for example, which may allow the fisheye lenses to be moved closer to the camera body 650 leading to a reduction in overall size of the system. In the particular example shown in FIGS. 6A-6D, the offset is a vertical offset, which is created by moving the fisheye lenses downwards relative to the image sensor.

Figure 7:
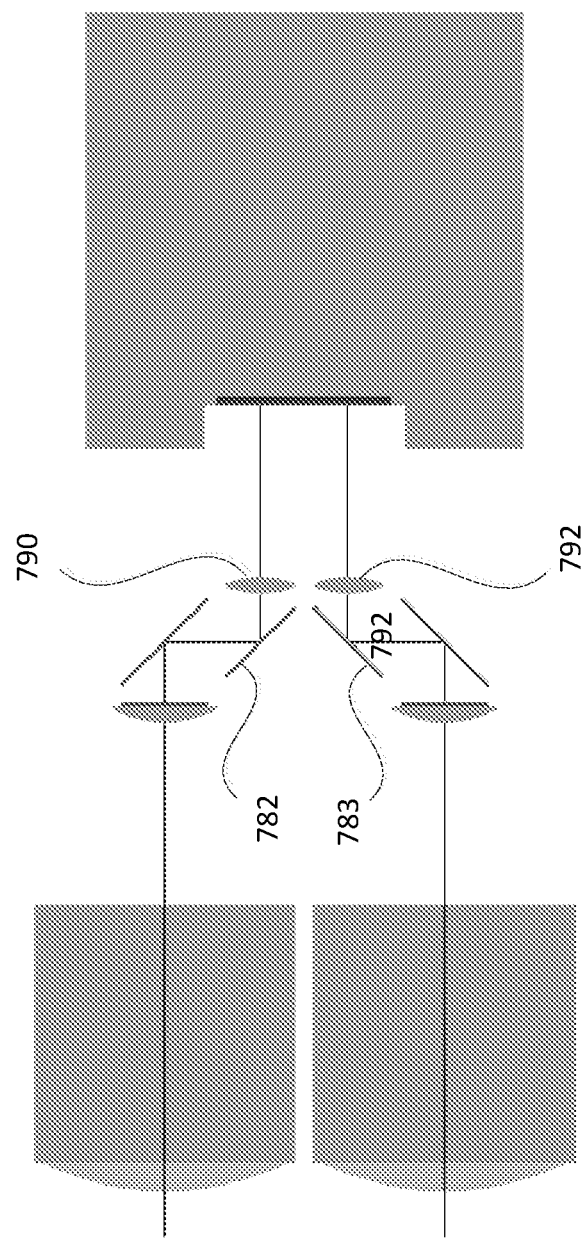
FIG. 7 illustrates another example an optical arrangement in accordance with implementations of the disclosure.

FIG. 7 illustrates another example of an optical arrangement 700 in accordance with implementations of the disclosure. In some implementations, depending of the flange focal distance of the fisheye lenses, the size of the image circles, and the size of the image sensors, the order of the mirrors and relay lenses may be changed along the optical axes. In some examples, the relay lens may be placed before the first mirror or after the last mirror of the pair of mirrors corresponding to a fisheye lens, instead of placing the relay lens in between the first and the last mirrors. In some examples, the first mirror may be placed before the field lens. In the example optical arrangement 700, the relay lenses 790 and 792 are placed after the last mirrors 782 and 783.

Figure 8B:
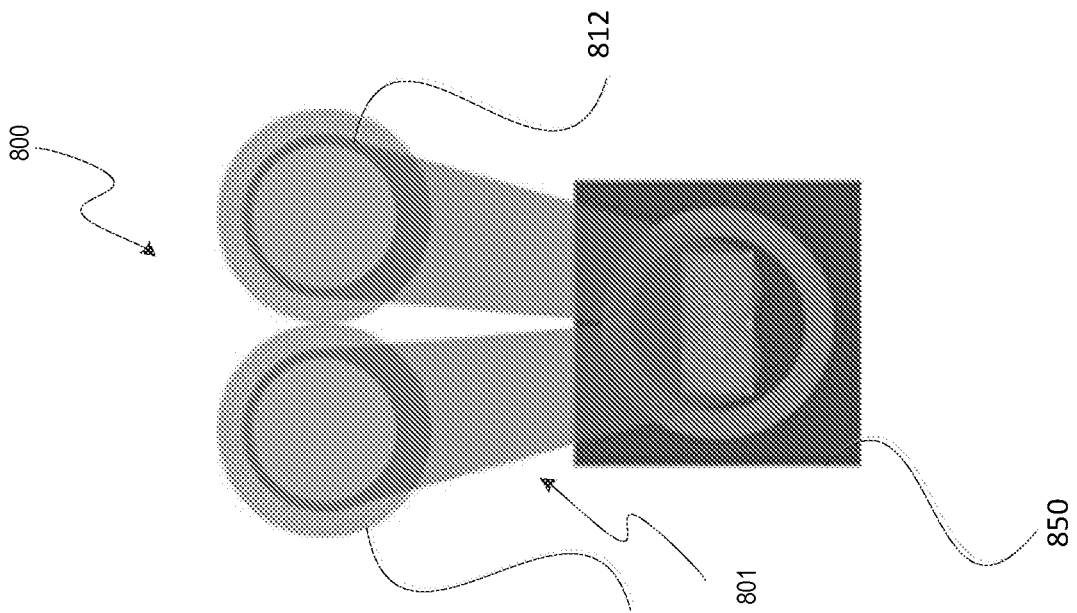
FIGS. 8A-8B illustrate example an apparatus comprising a camera, fisheye lenses and an optical arrangement in accordance with implementations of the disclosure.
Figure 8A:
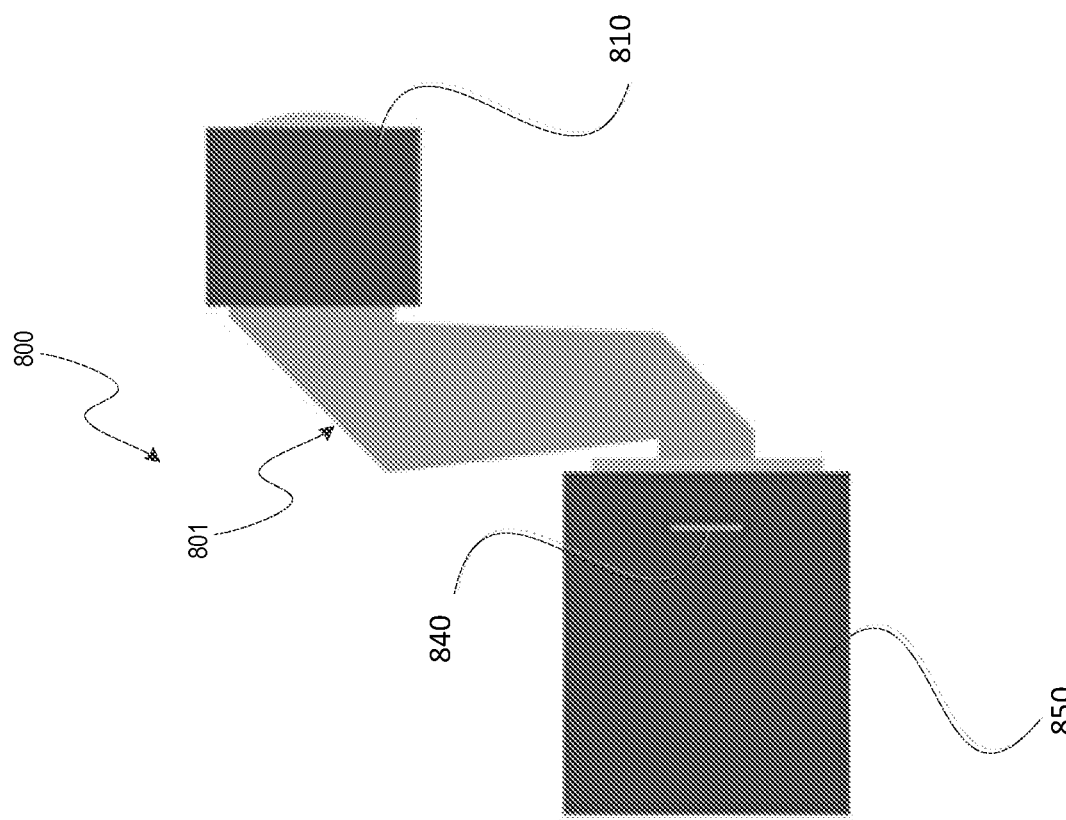

FIGS. 8A-8B illustrate examples of an apparatus 800 in accordance with implementations of the disclosure. The apparatus 800 may comprise a camera 850, two fisheye lenses 810 and 812, an optical arrangement 801, and an image sensor 840. The optical arrangement 801 may be comparable to any of the optical arrangements 280, 300, or 500. In some implementations, the optical arrangement 801 may be part of the camera 850. In some implementations one or more of the fisheye lenses 810 and 812 may be removably coupled to the camera 850 or the optical arrangement 801. In some implementations, the apparatus 800 may be used to provide stereoscopic images to a virtual reality HMD (not shown). In an implementation, a first of the copies of an initial image taken formed by the fisheye lenses 810 and 812 may be provided to a first eye piece of a virtual reality HMD (not shown) and a second of the copies of the initial image may be provided to a second eye piece of the virtual reality HMD. The first of the copies of the initial image may be digitally recorded by the camera and electronically transmitted to the first eye piece of the virtual reality HMD, and similarly, the second of the copies of the initial image may be digitally recorded by the camera and electronically transmitted to the second eye piece of the virtual reality HMD for playback in the HMD. Transmission and playback may be live, or the recorded image may be stored in digital form, and played back later.

Figure 9:
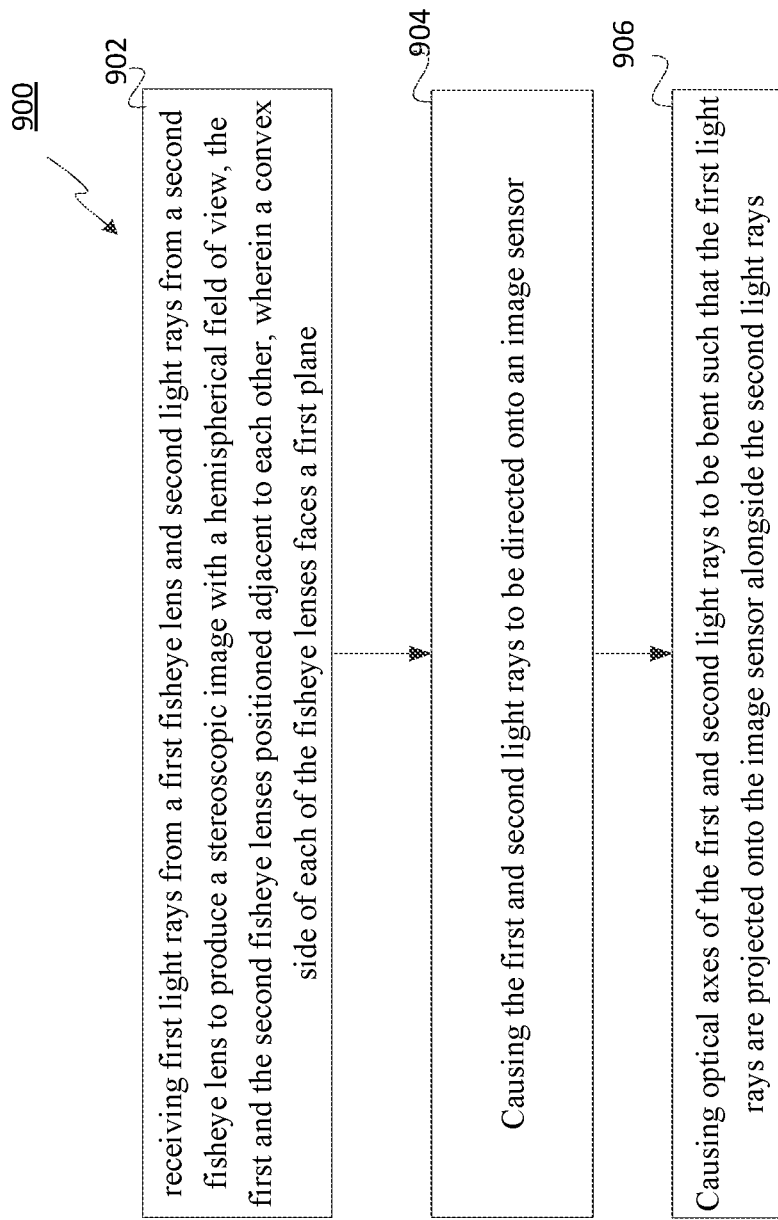
FIG. 9 is a flow diagram of one example of a method for producing a stereoscopic image with a hemispherical field of view, in accordance with an implementation of the disclosure.

FIG. 9 is a flow diagram of one example of a method 900 for producing a stereoscopic image with a hemispherical field of view, in accordance with an implementation of the disclosure. For example, method 900 may be performed using the apparatus 800 described with respect to FIGS. 8A-8B, and/or an optical arrangement 300 with respect to FIG. 3. While FIG. 9 and the associated description lists the operations of method 900 in certain order, various implementations of the method may perform at least some of the described operations in parallel and/or in arbitrary selected orders.

At block 902, first light rays from a first fisheye lens and second light rays from a second fisheye lens may be received to produce a stereoscopic image with a hemispherical field of view. The first and the second fisheye lenses may be positioned adjacent to each other. An object side of each of the fisheye lenses may face a first plane. At block 904, the first and second light rays may be caused to be directed onto an image sensor. At block 906, optical axes of the first and second light rays may be caused to be bent such that the first light rays are projected onto the image sensor alongside the second light rays. The light rays may produce initial images at a second plane substantially parallel to the first plane. In some embodiments, copies of the initial images may be formed at a third plane substantially parallel to the first plane. The copies of the initial image may be provided as the stereoscopic image with the hemispherical field of view. For example, the stereoscopic images may be provided for a VR environment.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular formed. Moreover, use of the term "an implementation" or "one implementation" or "an implementation" or "one implementation" throughout is not intended to mean the same implementation or implementation unless described as such. The terms "first," "second," "third," "fourth," etc. as used herein are meant as labels to distinguish among different elements and may not necessarily have an ordinal meaning according to their numerical designation.

It is to be understood that the above description is intended to be illustrative, and not restrictive. Other implementations will be apparent to those of skill in the art upon reading and understanding the above description. The scope of the disclosure may, therefore, be determined with reference to the appended claims, along with the full scope of equivalents to which such claims are entitled.

What is claimed is:

1. An apparatus comprising:
    an optical arrangement to produce a stereoscopic image with a hemispherical field of view, the optical arrangement to receive first light rays from a first fisheye lens and second light rays from a second fisheye lens, the first and second light rays entering the first and second fisheye lenses through an object side of each of the first and second fisheye lenses,
    wherein the first fisheye lens and the second fisheye lens are positioned adjacent to each other and the object side of each of the first and second fisheye lenses faces a first plane,
    wherein the optical arrangement is to:
        direct the first light rays and the second light rays onto an image sensor, and
        bend optical axes of the first and second light rays such that the first light rays are projected onto the image sensor alongside the second light rays, and
    wherein the optical arrangement is to modify a flange focal distance from each of the first and second fisheye lenses to the image sensor such that a modified value of the flange focal distance is greater than an initial value of the flange focal distance.

2. The apparatus of claim 1, wherein the first and second light rays from the first and second fisheye lenses, respectively, form initial images at a second plane substantially parallel to the first plane, the second plane corresponding to the initial value of the flange focal distance from the first and second fisheye lenses.

3. The apparatus of claim 2, wherein dimensions of the image sensor are smaller than combined dimensions of the initial images formed by the first and second light rays at the second plane.

4. The apparatus of claim 2, wherein the optical arrangement is configured to generate copies of the initial images at a third plane substantially parallel to the first plane, the third plane corresponding to the modified value of the flange focal distance from the first and second fisheye lenses.

5. The apparatus of claim 4, wherein the optical arrangement is configured to produce the copies of the initial images at the third plane that are smaller than the initial images at the second plane, such that the copies of the initial images at the third plane fit alongside one another within the image sensor.

6. The apparatus of claim 1, wherein a first distance between respective centers of the first and second fisheye lenses is approximately 65 millimeters.

7. The apparatus of claim 1, wherein a first diameter of the first or the second fisheye lenses is less than 65 millimeters.

8. The apparatus of claim 2, wherein a second diameter of each of the initial images at the second plane is substantially equal to a height of the image sensor.

9. The apparatus of claim 4, wherein a third diameter of each of the copies of the initial images at the third plane is substantially equal to half of a width of the image sensor.

10. The apparatus of claim 1, wherein respective centers of the first fisheye lens and the second fisheye lens are positioned on a fourth plane substantially perpendicular to the first plane, wherein a center of the image sensor is positioned on a fifth plane substantially perpendicular to the first plane, and wherein the fourth and the fifth planes are separated by an offset.

11. The apparatus of claim 2, further comprising: a set of convex lenses positioned at the second plane, the set of convex lenses configured to bend the light rays such that the light rays are directed through the optical arrangement.

12. The apparatus of claim 1, further comprising:
    a camera comprising the image sensor.

13. The apparatus of claim 12, wherein the camera comprises the optical arrangement.

14. The apparatus of claim 12, wherein the fisheye lenses are removably coupled to the camera.

15. The apparatus of claim 4, wherein a first of the copies of the initial image is provided to a first eye piece of a virtual reality head mounted display (HMD) and a second of the copies of the initial image is provided to a second eye piece of the virtual reality HMD.

16. The apparatus of claim 15, wherein the first of the copies of the initial image is digitally recorded and electronically transmitted to the first eye piece of the virtual reality HMD and the second of the copies of the initial image is digitally recorded and electronically transmitted to the second eye piece of the virtual reality HMD.

17. A system comprising:
- a first fisheye lens and a second fisheye lens to capture first light rays and second light rays entering the first and second fisheye lenses, respectively, through an object side of each of the first and second fisheye lenses, to produce a stereoscopic image with a hemispherical field of view, the first and the second fisheye lenses positioned adjacent to each other wherein the object side of each of the fisheye lenses faces a first plane;
- an image sensor to receive the first and second light rays captured by the first and second fisheye lenses, respectively; and
- an optical arrangement positioned between the first and the second fisheye lenses and the image sensor, the optical arrangement to:
  - bend optical axes of the first and the second light rays such that the first light rays are projected onto the image sensor alongside the second light rays, wherein the optical arrangement is to modify a flange focal distance from each of the first and second fisheye lenses to the image sensor such that a modified value of the flange focal distance is greater than an initial value of the flange focal distance.

18. A method comprising:

receiving first light rays from a first fisheye lens and second light rays from a second fisheye lens to produce a stereoscopic image with a hemispherical field of view, the first and second light rays entering the first and second fisheye lenses through an object side of each of the first and second fisheye lenses and the first and the second fisheye lenses positioned adjacent to each other, wherein the object side of each of the fisheye lenses faces a first plane;

causing the first and second light rays to be directed onto an image sensor;

causing optical axes of the first and second light rays to be bent such that the first light rays are projected onto the image sensor alongside the second light rays; and modifying a flange focal distance from each of the first and second fisheye lenses to the image sensor such that a modified value of the flange focal distance is greater than an initial value of the flange focal distance.

* * * * *